United States Patent [19]
Hagiwara et al.

[11] Patent Number: 5,376,307
[45] Date of Patent: Dec. 27, 1994

[54] FLUOROCARBON PAINT COMPOSITION

[75] Inventors: Minori Hagiwara; Kenji Kiwa, both of Yokohama, Japan; Laurence W. McKeen, Sewell, N.J.

[73] Assignee: E. I. Du Pont de Nemours and Company, Wilmington, Del.

[21] Appl. No.: 114,641

[22] Filed: Sep. 3, 1993

Related U.S. Application Data

[63] Continuation-in-part of Ser. No. 768,921, filed as PCT/US91/05640, Aug. 8, 1991, abandoned.

[30] Foreign Application Priority Data

Aug. 9, 1990 [JP] Japan .................... 2-211421

[51] Int. Cl.$^5$ ......................... H01B 1/00; H01B 1/20
[52] U.S. Cl. ........................ 252/518; 106/455; 106/491; 106/417
[58] Field of Search .................. 252/512, 518; 106/415, 106/417, 455, 491

[56] References Cited

U.S. PATENT DOCUMENTS

| | | | |
|---|---|---|---|
| 3,970,627 | 7/1976 | Seymus | 524/449 |
| 4,150,008 | 4/1979 | Vassiliou et al. | 524/431 |
| 4,252,859 | 2/1981 | Concannon et al. | 524/520 |
| 4,482,476 | 11/1984 | Yoshimura et al. | 252/502 |
| 5,051,209 | 9/1991 | Mirabeau et al. | 252/518 |
| 5,071,676 | 12/1991 | Jacobson | 427/214 |

FOREIGN PATENT DOCUMENTS 0359569 3/2190 European Pat. Off. .

*Primary Examiner*—Paul Lieberman
*Assistant Examiner*—M. Kopec
*Attorney, Agent, or Firm*—R. H. Burgess

[57] ABSTRACT

A coating composition of a perfluorocarbon resin and an electroconductive double shell pigment comprising inner shells of amorphous silica or a silica-containing material and outer shells of antimony-containing tin oxide is useful on a copy roller or belt.

4 Claims, 1 Drawing Sheet

FLUOROCARBON PAINT COMPOSITION

This is a continuation-in-part of application Ser. No. 07/768,921 filed as PCT/US91/05640, Aug. 8, 1991, now abandoned.

BACKGROUND OF THE INVENTION

This invention relates to a perfluorocarbon paint composition and, more particularly, to a perfluorocarbon paint composition for forming a fluorocarbon coating of an antistatic property and release property.

Fluorocarbon resins have excellent physical properties in release, heat resistance, chemical resistance, weather resistance, low coefficient of friction, and a fluorocarbon paint having a major constituent of a fluorocarbon resin is in use in a variety of fields. Despite these properties, a fluorocarbon paint fails to exhibit its inherent release property in some fields of application due to its high electrostatic property, which tends to cause foreign substances to be electrostatically attached to the surfaces of fluorocarbon coatings. What has been done in the past is to impart an anti-electrostatic property to the paint composition by adding thereto an electroconductive material, such as carbon blacks, carbon fiber powders, metallic powders, or fibrous potassium titanates coated with an electroconductive metal oxide.

Carbon black or a carbon fiber powder, which inherently has high water absorption properties, however, not only sharply increases its viscosity upon stirring, when added to a liquid fluorocarbon paint, but poses problems both in manufacture and applications, such as coagulation of the paint which takes place as the dispersion structure of the paint becomes unstable. When the same is added to a fluorocarbon paint in powder form, its apparent melt viscosity at the time of paint baking is so high that it has been difficult to satisfy the requirements of both forming uniform coating film and imparting sufficiently high electric conductivity thereto.

Powdered metals do not impart sufficient electroconductivity unless added in a large amount, and are expensive. Further, powered metals which have a high specific gravity tend to precipitate when added to liquid phase fluorocarbon paints, thus requiring repeated stirring while in use. Still further, there is a danger of explosion during the paint manufacturing process, depending upon the type and/or amount of the metal used. A further disadvantage is that the degree of improvement in conductivity of the paint is small in relation to the volume of added metal.

Fibrous potassium titanate coated with a electroconductive metal oxide has been brought into use more in recent years than the above cited electroconductive material. As disclosed in Japanese Patent Application Kokoku-Publication 1-38827, tin dioxide and antimony trioxide have been mainly used as electroconductive metal oxides. Due to its high oil absorbing property, however, potassium titanate, when added to a liquid fluorocarbon paint, tends to increase the viscosity of the paint and renders the dispersion structure thereof to be unstable, which easily creates coagulation of a paint. When added to a fluorocarbon paint, cracks tend to be formed in the coating after painting operation due to decreases in fluidity and heat melting property of the paint which are brought about by potassium titanate. In addition, the fibrous potassium titanate coated with an electroconductive metal oxide has insufficient electroconductivity due to the fact that the potassium titanate which is of less electroconductivity occupies a considerable proportion of the entire volume and must therefore be added in a large amount, with the result that the release property of fluorocarbon coatings is damaged.

The invention provides a fluorocarbon paint composition capable of forming fluorocarbon coatings of an excellent anti-electrostatic property and release property, without inviting the above drawbacks at the time of manufacture, storage and use.

SUMMARY OF THE INVENTION

The above object can be attained by the provision of (1) a fluorocarbon paint composition (preferably aqueous) containing a fluorocarbon resin; and a hollow double-shell electroconductive material comprising hollow inner shells and outer shells coated on the surfaces of the inner shells and formed substantially of an electroconductive oxide; the ratio of the hollow double-shell electroconductive material in a coating component of the fluorocarbon paint composition being in the range of 1% to 30% by volume and (2) a fluorocarbon paint composition as described in (1) above wherein said hollow, double-shell, electroconductive material is hollow double-shell electroconductive particle having hollow inner shells formed substantially of amorphous silica or a silica-containing material, and outer shell formed substantially of tin (IV) oxide containing or doped with about 1% to 30%, preferably about 10%, by weight of antimony. Percentages and proportions herein are by weight (wt) except where indicated otherwise. Pigment concentrations are generally indicated to be by volume because this is more relevant. The weight percentages of pigment in the cured film corresponding to 1% to 30% by volume are about 1.2% to 34% by weight.

A BRIEF DESCRIPTION OF THE DRAWINGS

FIG. 1 is a schematic view in cross-section of the hollow double-shell electroconductive particle of the invention; and FIG. 2 is a graph representing the relationship between the ratio in wt % of the hollow double-shell electroconductive material in the coating component of the fluorocarbon paint composition embodying this invention and the volume specific resistivity of the coating.

In FIG. 1, 1 is the inner shell and 2 is the outer shell of the electroconductive particle.

DETAILED DESCRIPTION

The invention will be described below further in detail.

Figure 1:
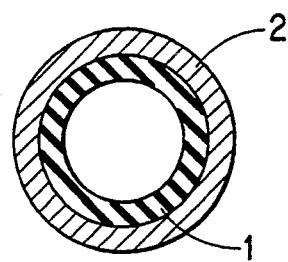

In the fluorocarbon paint composition according to this invention, a hollow, double-shell, electroconductive material is used as the electroconductive material. The hollow, double-shell, electroconductive material is a conductive material having a hollow inner shell and an outer shell coated on the surface of the inner shell and formed substantially of an electroconductive oxide. FIG. 1 schematically illustrates a cross-section of the hollow, double-shell, electroconductive particle.

The inner shell 1 of the hollow, double-shell, electroconductive material is a hollow particle formed substantially of amorphous silica or a silica-containing material, with a preferred thickness of 5 to 20 $\mu$m.

The outer shell 2 of the hollow, double-shell, electroconductive material is layer of a thickness of, for example, 5 to 20 nm coated on the outer surface of the inner shell and formed substantially of a conductive oxide, which preferably is a tin (IV) oxide and antimony trioxide, i.e., an antimony-containing tin (IV) oxide. The ratio of the antimony with respect to the tin oxide may, for example, be in the range of about 1% to 30%, preferably about 10% by weight. The outer shell 2, being a layer of an electroconductive oxide (crystallites of an antimony-containing tin oxide), covers the entire outer surface of the inner shell 1 and constitutes a two-dimensional conducting network of the crystallites to have electroconductivity in the directions of extension of the layer or coating. Although the electroconductive pigments used in the invention can be hollow shells, they can also be built on cores of silica, $TiO_2$, mica, or other inert materials.

The configuration of the hollow double-shell conducting particle including the inner and outer shells is, for example, in the shape of a plate or a sphere with a sphere-equivalent diameter, for example, of 0.1 $\mu$m to some tens of $\mu$m.

In relation to the chemical composition of the inner and outer shells of the hollow double-shell electroconductive material according to this invention and a process of making such material, the specification of European Patent Application 359569, published Mar. 21, 1990, is relevant. As long as it is not contrary to the objects of this invention, all of the electroconductive compositions disclosed therein may be used as preferred electroconductive materials of this invention.

In the paint composition acceding to this invention, the ratio of the hollow doubler-shell electroconductive material ranges from 1% to 30% by volume of the solids components of the fluorocarbon paint composition, the coating component being one which forms a coating upon baking of the fluorocarbon paint composition, viz. a component of the fluorocarbon paint composition excluding the component which will volatilize in the baking process. Since the paint composition of the invention contains the hollow double-shell electroconductive material in 1% to 30% by volume of the coating component, it follows that a fluorocarbon coating formed of the paint composition of the invention contains 1% to 30% by volume of the hollow double-shell electroconductive material. No useful anti-electrostatic property is imparted to the coating at a ratio less than 1% volume of the electroconductive material in the coating component. A ratio exceeding 30% by volume results in lowering of the release property, adhesion to an object to be painted, corrosion resistance, etc. of the coating. Preferably, the ratio of the hollow double-shell electroconductive material ranges from 3 or 5% to 25% by volume of a coating component of the fluorocarbon paint composition, most preferably 6% to 20% by volume.

As examples of the perfluorocarbon resin used in the fluorocarbon paint composition according to this invention may be cited polytetrafluoroethylene (PTFE), a tetrafluoroethylene-perfluoroalkyl vinyl ether copolymer resin (PFA) and, a tetrafluoroethylene-hexafluoropropylene copolymer resin (FEP). Preferably the perfluorocarbon resin used in a blend of 10% to 50 wt % PFA or FEP, the balance PTFE. More preferably, it is 15% to 30% PFA, 70% to 85 wt % PTFE.

The ratio of the perfluorocarbon resin to electroconductive pigment in the coating component of the fluorocarbon paint composition of the invention is in the range of 70 to 99% by volume.

Fluorocarbon resins other than perfluorocarbon resin, which are not fully fluorinated, such as ethylenetetrafluoroethylene copolymer resin, polyvinylidene fluoride resin, and polyvinyl fluoride resin, do not have the temperature resistance and other properties needed.

In addition to the above-mentioned fluorocarbon and the hollow double-shell electroconductive material, the fluorocarbon paint composition of the invention may contain a solvent or a dispersing medium, a coalescence-aiding dispersion, such as acrylic dispersion, an oxidation-promoting catalyst solution, such as a cerium octoate solution, or other various additives ordinarily added to fluorocarbon paint compositions. Further, the hollow double-shell electroconductive material used in the invention is a fine powder presenting a slightly transparent, light gray appearance, so that the fluorocarbon paint composition added with such electroconductive material may be pigmented in various colors by addition thereto of mica pigment and a small amount of other heat-resisting, colorant pigments.

The paint according to this invention is suited not only for spray, brush or roll coating, but also for flow coating or immersion in applications where painting with relatively low viscosity is desired.

Typical applications of the fluorocarbon paint composition of the invention are for fusing rolls or fusing belts used in copying machines and printers, where the paint composition provides surfaces with both release property and anti-electrostatic characteristics when deposited thereon, to prevent offsetting of a toner material from occurring. Because of required heat resistivity, the fluorocarbon that may be preferably used in this instance is polytetrafluorethylene and/or tetrafluoroethylene-perfluoroalkylvinyl ether copolymer. The paint composition of the invention may be used to provide coatings surfaces of, for example, hoppers for transporting powder material, sizing rolls in paper manufacturing, feed rollers used in plastic film extruder, and textile sizing and drying rolls.

As has been described, the fluorocarbon paint composition of the invention employs a hollow, double-shell, electroconductive material as the electroconductive material for blocking electrostatic charge buildup. Since the electroconductive material is hollow, microspherical particles, it is hard for it to precipitate when added to fluorocarbon resin compositions, and thus permits the paint composition to retain a stable dispersion state. The oil absorption of the double-shell electroconductive material of the invention is within the range of 10 to 50 mg/100 g and is far less than that of other electroconductive materials of a known type. Note that the oil absorption of carbon black ranges from 100–300 mg/100 g and that of potassium titanate fiber material coated with a tin oxide and an antimony trioxide 220–270 mg/100 g. Even though carbon black can give equal electroconductivity at lower volume concentrations than those of the invention, the oil absorption makes it less desireable. Because of this, the electroconductive material used in the invention, when added to a fluorocarbon paint composition, in a liquid condition has less tendency to sharply increase the viscosity upon agitation and to cause coagulation due to a generated instability of dispersion.

Further, the hollow double-shell electroconductive material of the invention provides coatings with higher electroconductivity per unit volume comparing with a conventional electroconducting material. More specifically, the shape of the hollow double-shell electroconducting material of the invention is of a sphere or a thin film in the shape of a broken piece of the sphere or other curved surface to permit a electroconducting network to be established within the coating, so that a paint containing the electroconductive material of the invention provides a coating of higher electroconductivity than one obtained by adding the known electroconducting material in the same volume. As will be described later in connection with Examples, the electroconducting material of the invention added in an amount of about 15 wt % or less of the coating component may provide a range of the volume specific resistance values (on the order of $10^{10}$ to $10^4$ Ωcm) of coatings, which is required for fusing rolls or fusing belt generally used in copying machines and printers. It will be appreciated that since the electroconductive material may be added in a smaller amount than in the past according to this invention to obtain anti-electrostatic properties required of fluorocarbon coatings, fluorocarbon coatings excellent in anti-electrostatic property and of release property may be formed without damaging the various inherent properties of the fluorocarbon by the addition of the electroconductive material. When the electroconducting material of the invention in the fluorocarbon paint of the invention is in a certain ratio, such as, about 10 wt % of the coating component, the volume specific resistivity of the coating varies widely despite a narrow margin of change of amount in which the electroconductive material is added. Accordingly, the non-electroconductivity of the coating may be freely adjusted merely by slightly changing the amount of the electroconductive material.

It has been found that fluorocarbon coatings formed by the paint composition of the invention exhibits an excellent abrasion resistance, so that the resin composition finds its suitable application in copying rolls whose surfaces are subjected to abrasion by the action of papers. To improve abrasion resistance as can be attained by this invention, cannot be expected from a known electroconductive material having a major constituent of potassium titanate, which is weak in physical strength and broken easily.

EXAMPLES

The components of Table 1 were mixed to prepare Sample 1 of fluorocarbon paint composition. The ratio of the electroconductive material or pigments contained in Sample 1 was changed as shown in Table 2 to prepare Samples 2 to 5 with the remaining constituent elements added in suitably adjusted ratios to maintain the original relative ratios.

After coating on substrates of glass in thicknesses of about 25 μm, Samples 1 to 5 were fired at 420° C. for 3 minutes. The volume specific resistivities of resultant coatings were measured, with results shown in Table 2 and FIG. 2.

TABLE 1

| Components | Weight % |
| --- | --- |
| PTFE Dispersion (Teflon 30-DuPont) a suspensoid of PTFE in distilled water, stabilized with 6% Triton X-100 surfactant from Rohm & Haas | 45.921 |
| PFA Dispersion (Teflon 335 PFA-DuPont) suspensoid of PFA in water stablized with Triton X-100 | 8.297 |
| Water | 2.699 |
| Electroconducting Pigment Dispersion | 12.195 |
| Yellow Pigment Dispersion | 1.899 |
| TiO$_2$-Coated Mica Afflair Pigments | 1.999 |
| Catalyst Solution - cerium octoate | 10.396 |

TABLE 1-continued

| Components | Weight % |
| --- | --- |
| Acrylic Resin - coalescing agent | 16.594 |

A commercial non-stick primer is applied at 7.5 to 10 μm on a grit blasted aluminum surface. It is then baked ten minutes at 50° C. It is then topcoated with 15 to 25 μm of topcoat and baked ten minutes at 420° to 427° C. metal temperature for 3 minutes. This gives a pigment volume concentration (PVC) in total of 13.87% and for the electroconductive pigment of 8.86% or 9.1% by weight.

TABLE 2

| Sample # | Added amount of electroconductive pigments (relative to solids component weight %) | Volume specific Resistivity (Ω cm) |
| --- | --- | --- |
| 1 | 0.0 | >$10^{15}$ |
| 2 | 9.1 | $4.8 \times 10^9$ |
| 3 | 15.3 | $1.2 \times 10^4$ |
| 4 | 18.1 | $3.0 \times 10^3$ |
| 5 | 22.0 | $2.7 \times 10^3$ |
|   | 52.5 | $1.1 \times 10^2$ |

As shown in Table 2, it will be seen that addition of the electroconductive material of the invention only in an amount of about 15% by weight of the coating component has successfully reduced the volume specific resistivity of the coatings to the order of $10^4$ Ωcm.

Figure 2:
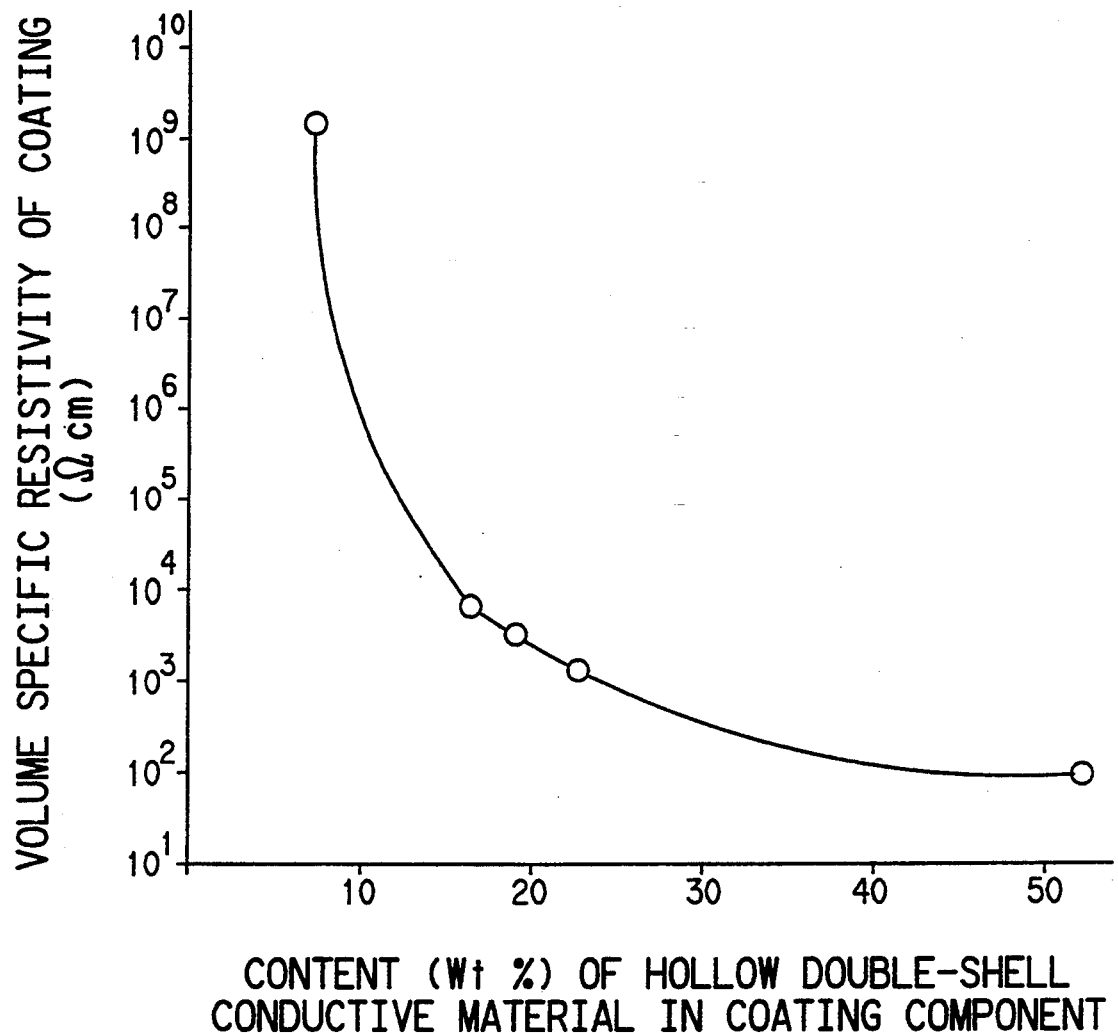

Yet from FIG. 2, it will be seen that the volume specific resistance value of the coatings sharply decreased when the amount of the electroconductive material contained in the coating reached about 10 wt %.

Experiments on the abrasion resistance of the fluorocarbon resin paint composition of this invention were subsequently performed. New Samples 6 to 8 were prepared in the same manner as Sample 1 except that the ratio of the hollow double-shell electroconductive material in the coating component in composition of the Sample 1 was varied, respectively, at 0 wt %, 9 wt % and 18 wt %.

On aluminum plates of 40mm×40mm×5mm having been subjected to ordinary initial surface treatments (grit blast treatment and primer and optional intermediate coating with ordinary primers for non-stick coatings that may optionally include electroconductive pigments) were, respectively, coated Samples 6, 7 and 8 and a reference sample using the indicated ranges of PTFE/PFA (a commercially available powder fluorocarbon Teflon, registered trademark, PFA MP-102 from DuPont) for painting, so that the thicknesses of the coatings after baking became 25 microns (or 30 microns if the thickness of the primer was added). The deposited Samples were subjected to baking for 15 minutes at temperatures of 400° C.

The amounts of abrasion of the thus-obtained four kinds of fluorocarbon coating were measured using a thrust abrasion tester made by Oriented Co. The measurements were carried out with SS41 stainless steel rings as mating members and with a load of 0.8 kg/cm$^2$, at a rate of 500 mm/min, for 110 minutes, to pick up results at points of 10 minutes and 120 minutes after start of the experiment and to obtain differences. This same experiment took place three times on each sample. A total of weight losses after the three experiments are given in Table 3. This shows the abrasion resistance added by increased amounts of electroconductive pigment in blends, and contrasts this with softer PFA coatings used in less abrasive applications.

TABLE 3

| Samples | Ratio of conductive material in Coating Component | Weight loss ($\times 10^{-1}$ mg) | Ratio PTFE/PFA |
| --- | --- | --- | --- |
| Sample 6 | 0 wt % | 30.7 | 85/15 |
| Sample 7 | 9 wt % | 1.5 | 85/15 |
| Sample 8 | 18 wt % | 0.3 | 85/15 |
| Reference Sample | 0 wt % | 58.7 | 0/100 |

Table 3 shows that, in addition to its anti-electrostatic property already mentioned, coatings formed by the fluorocarbon paint composition according to the invention each have an excellent property also in abrasion resistance.

As has been explained above, the fluorocarbon paint composition of the invention uses, as a electroconductive material, a hollow double-shell electroconductive material comprising a hollow inner shell and an outer shell coated on the surface of the inner shell and formed substantially of a electroconductive oxide, so that it is possible to form fluorocarbon coatings of an anti-electro-static nature and release property and yet of excellent abrasion resistance. Tests similar to those of Table 3 were conducted with a composition of the invention between samples 7 an 8, having 12.5% electroconductive pigment in comparison with an optimized commercial coating which substituted potassium titanate conductive whiskers for the electroconductive pigment. Both gave good freedom from toner stain and no electrostatic offsetting, but the whisker coating gave a weight loss in the thrust tester of $2.6 \times 10^{-1}$ mg, compared to 0.3 for the coating of the invention, and the coating of the invention had a relative life of 2.5 times that of the whisker coating, lasting for 500,000 copies versus 200,000. This is most significant in the real world of commercial copying machines, and such results show an important superiority.

We claim:

1. A perfluorocarbon paint composition containing hollow double-shell electroconductive particles comprising hollow inner shells formed substantially of amorphous silica or a silica-containing material and outer shells coated on surfaces of the inner shells formed substantially of antimony-containing tin (IV) oxide., the percentage of said hollow double-shell electroconductive material based on the solids of said perfluorocarbon paint composition being in the range of 1 to 30% by volume, and in which paint composition the perfluorocarbon resin comprises 10% to 50% by weight of a copolymer of either tetrafluoroethylene and perfluoroalkyl vinyl ether or a copolymer of tetrafluoroethylene and hexafluoropropylene and 50to 90% by weight of polytetrafluoroethylene.

2. The paint composition of claim 1 in which the antimony content of the tin (IV) oxide in the outer shell is about 1% to 30% by weight of the tin oxide.

3. The paint composition of claim 1 in which the percentage of electroconductive material is from 6 to 20% by volume.

4. The paint composition of claim 1 in aqueous form.

* * * * *